(12) United States Patent
Boesch et al.

(10) Patent No.: US 7,071,823 B2
(45) Date of Patent: Jul. 4, 2006

(54) SYSTEM AND METHOD FOR CENTRALIZED SECURITY SCREENING

(76) Inventors: Brian Boesch, 2939 Fort Lee St., Oak Hill, VA (US) 20171; William Peterson, 2832 Fox Mill St., Oak Hill, VA (US) 20171

( * ) Notice: Subject to any disclaimer, the term of this patent is extended or adjusted under 35 U.S.C. 154(b) by 0 days.

(21) Appl. No.: 10/422,526

(22) Filed: Apr. 24, 2003

(65) Prior Publication Data

Related U.S. Application Data

(60) Provisional application No. 60/375,031, filed on Apr. 24, 2002.

(51) Int. Cl.
*G08B 13/14* (2006.01)

(52) U.S. Cl. .................. 340/568.1; 340/531; 378/57

(58) Field of Classification Search ............ 340/568.1, 340/572.1, 531, 572.4; 378/57
See application file for complete search history.

(56) References Cited

U.S. PATENT DOCUMENTS

| | | | | |
|---|---|---|---|---|
| 3,678,278 | A | * | 7/1972 | Peil .............................. 378/57 |
| 4,471,343 | A | * | 9/1984 | Lemelson .................. 340/5.31 |
| 5,182,764 | A | * | 1/1993 | Peschmann et al. .......... 378/57 |
| 6,218,943 | B1 | * | 4/2001 | Ellenbogen .............. 340/572.1 |
| 6,707,879 | B1 | * | 3/2004 | McClelland et al. .......... 378/57 |
| 2003/0085163 | A1 | * | 5/2003 | Chan et al. .................. 209/589 |
| 2004/0088584 | A1 | * | 5/2004 | Shachar et al. ............. 713/201 |

* cited by examiner

*Primary Examiner*—Thomas Mullen
(74) *Attorney, Agent, or Firm*—Roberts Abokhair & Mardula, LLC

(57) ABSTRACT

A system and method for centralized security screening of packages including baggage. The system creates images and data concerning baggage to be reviewed, packetizes the data long with additional identification information, and conveys the data packets to a central screening location. All analysis of the baggage information is accomplished in a centralized way with risk assessments being provided to each image. Upon sensing of a package or baggage of concern, alerts may be sent to the screening location for action. Artificial intelligence tools are used to pre-screen images to assist with workload assignment.

7 Claims, 2 Drawing Sheets

SYSTEM AND METHOD FOR CENTRALIZED SECURITY SCREENING

CROSS REFERENCE TO RELATED APPLICATION

Figure 1:
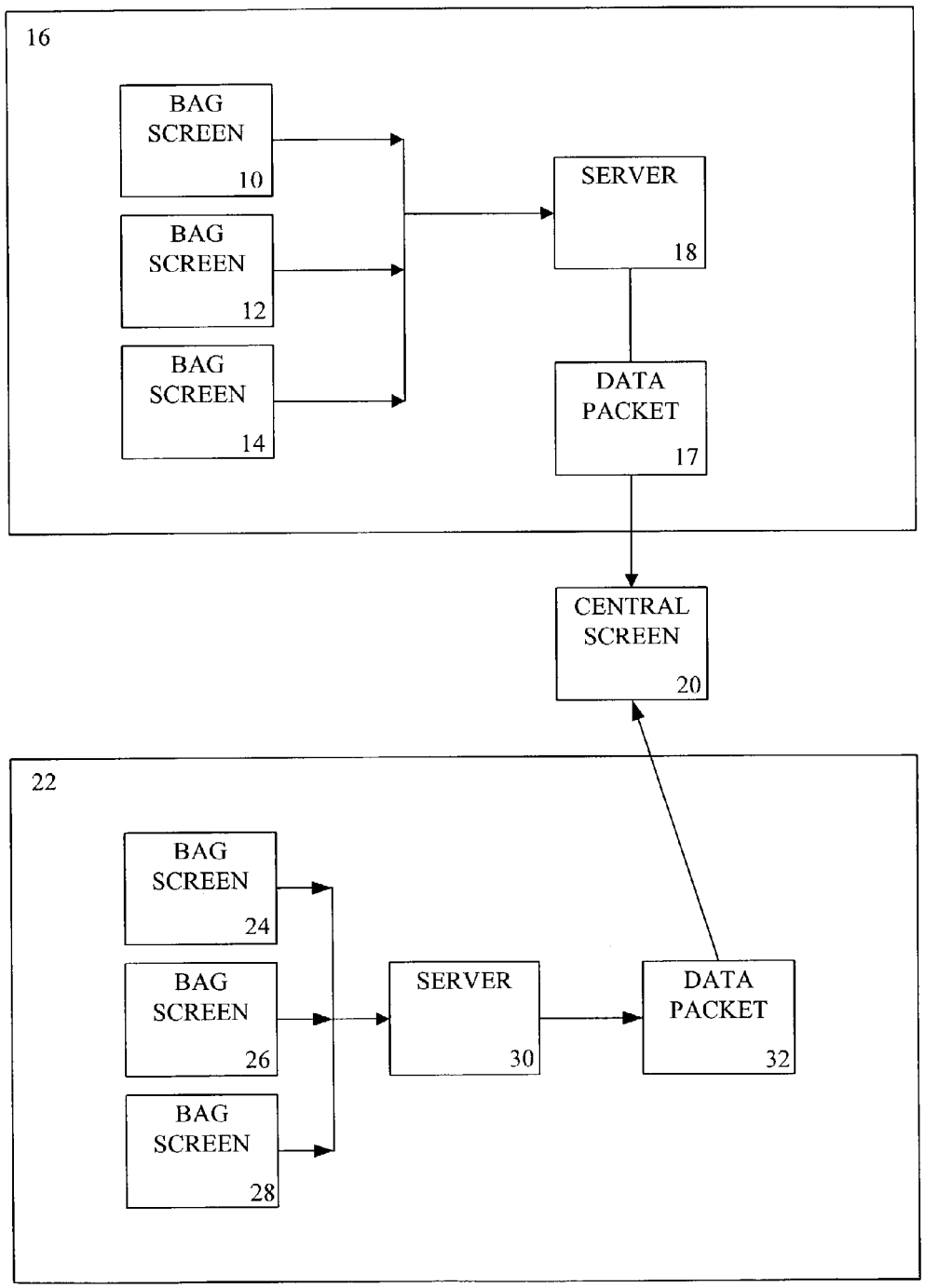

This application claims priority from U.S. provisional patent application Ser. No. 60/375,031, filed Apr. 24, 2002.

FIELD OF THE INVENTION

This invention related generally to baggage screening. More particularly the present invention is a system and method for centralized screening of images of bags passing through security screen checkpoints, and the methods for training and quality control. In addition, other applications of this system and method are envisioned in the field of security and screening application such as entrance guard stations and vehicle inspection at checkpoints.

BACKGROUND OF THE INVENTION

Since Sep. 11, 2001 security has been a heightened concern of the private sector, all travelers and government organizations. Nowhere has the security been more emphasized than in the airline travel industry. The screening of individual articles of clothing and baggage has now become a priority item for expenditure of government funds and for purchase of new equipment and training of competent individuals.

At the present time airline baggage screening is at an extremely slow process often resulting in passenger delays and frustration on the part of the traveling public. Further, each baggage screening point generally requires two or more people to view images of bags being screened at each screening point. Hence the entire screening process is quite labor intensive.

To make matters worse, the level of screening to be accomplished exceeds the capabilities both in terms of manpower and in training of individuals who are to perform the screen. Thus workers who are tired from working long shifts make mistakes. In addition, poorly trained screeners are rushed into the screening process and make additional mistakes. In addition to all of the above, workers who are screeners understand that their effectiveness cannot really be measured. Therefore their attention to their job tends to be less than optimum.

The current situation with the checkpoint screening of bags is less than satisfactory. Bags are scanned and images are locally displayed, there is no record of the screening action and a local operator of screening equipment must then evaluate the extra images or other types of images that are collected. Given the huge lines that occur in certain airports, operators are rushed and therefore overloaded, or in some cases they are under utilized. While it is possible to use certain sophisticated artificial intelligence image analysis, this only improves the performance slightly at the screening location.

What is therefore required is a system and method for improved baggage screening. Such a method would improve the speed of the screening, decrease man power required for the screening, make metrics available so that worker efficiency and system efficiency can be tested, increase the responsiveness to any potential threats and enable the detection of potential attacks that are in progress.

SUMMARY OF THE INVENTION

It is therefore an objective of the present invention to enhance the quality of security inspection of baggage.

It is a further objective of the present invention to increase the speed at which security assessments of baggage can be made.

It is still another objective of the present invention to decrease the amount of labor required to inspect baggage at security checkpoints.

It is yet another objective of the present invention to provide for the measurement of the effectiveness of both the screening process and of individual screeners as well as enhancing training.

It is still another objective of the present invention to enable a nationwide linking of an inspection system so that assessment of nationwide attacks can be made. For example, on Sept 11, a large number of individual bags carried small knives. While one or two such knives may be normal, the presence of a large number of independent bags with knives may have signaled a problem.

It is a further objective of the present invention to increase the responsiveness to various changes in levels of threat associated with airline and other transportation travel.

It is a further objective of the present invention to enable collection of a digital record of inspection decisions.

It is a further aspect of the present invention to balance the workload of inspection across multiple scanning stations and locations.

It is still another aspect of the present invention to shift the location of the "inspection" to locations where labor is more cost effective.

It is yet another aspect of the present invention to provide layers of inspections where simple images are inspected at one level while more complex images are inspected by higher trained individuals.

It is still another aspect of the present invention to apply centralized screening of images to support under vehicle inspection, cargo inspection, entrance and exit inspection, and other access control inspections.

It is a further aspect of the present invention to utilize centralized screening for quality assurance reviews, quality control, and other related industrial applications.

It is still another aspect of the present invention to apply artificial intelligence based tools for pre-screening of images prior to invoking a human review of images collected.

It is a further objective of the present invention to sense with multiple sensors, and combine the images to create an enhanced composite image for subsequent inspection via artificial intelligence means or via human interface.

It is still another aspect of the present invention to link inspection centers across broad geographic areas in order to determine if any simultaneous trends are occurring in different airports, ports of entry, or other facilities conducting inspections.

These and other objectives of the present invention will be apparent from a review of the specification that follows.

The present invention is a system and method for enhanced security screening of baggage. The invention comprises a network of local x-ray machines, explosive "sniffers" and other sensors which locally collect data and images, collectively termed "screening data". Such screening data is then bundled into a data package and transmitted to a central location. Thereafter the screening data are evaluated centrally and a response rapidly sent back to the security checkpoint. Such response can be either an "ok" for the baggage or a message for implementing an enhanced enforcement mechanism.

BRIEF DISCRIPTION OF THE FIGURES

FIG. 1 illustrates the overall system of the present invention.

Figure 2:
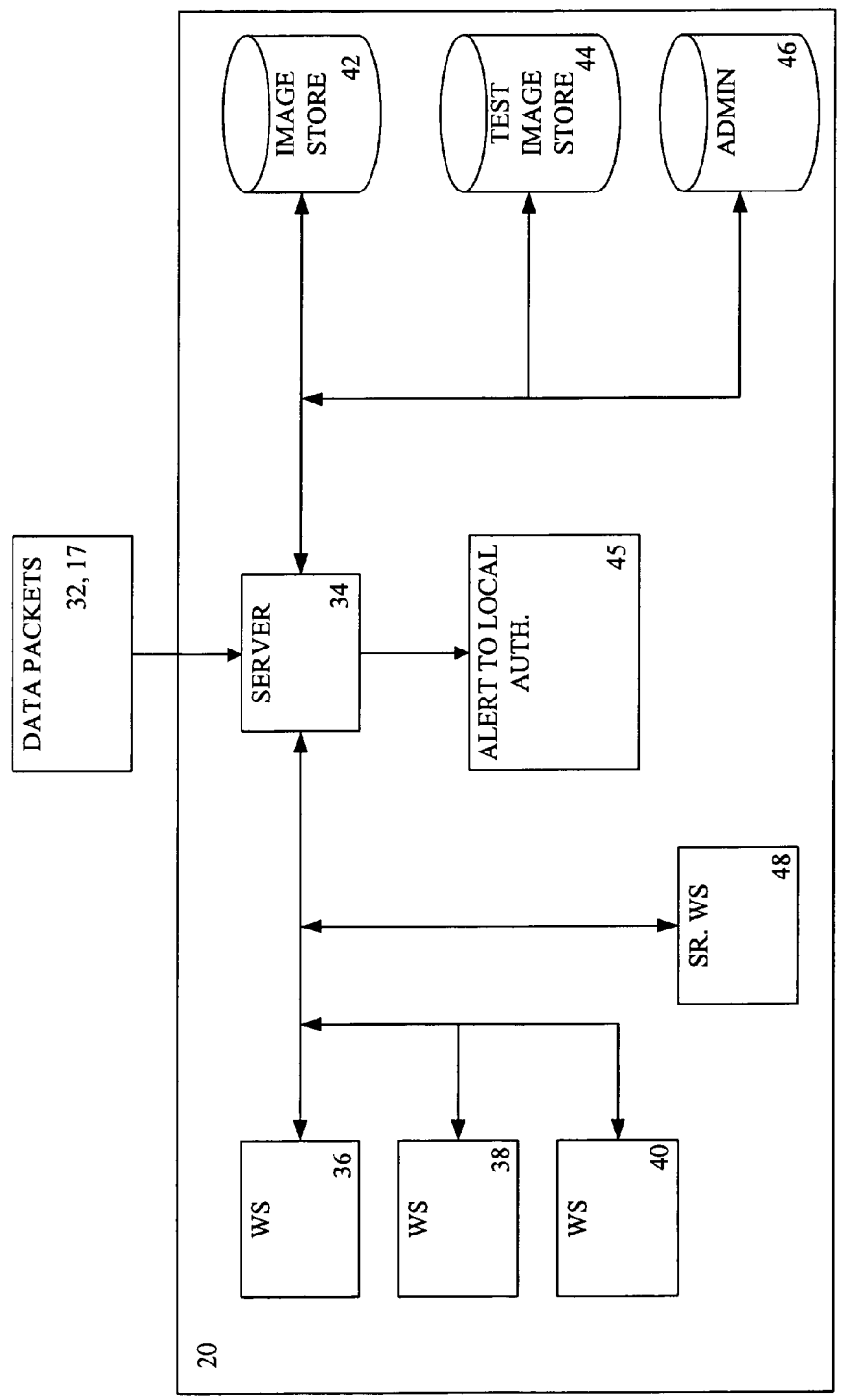

FIG. 2 illustrated the central evaluation facility of the present invention.

DETAILED DISCRIPTION OF THE INVENTION

As noted above, the present invention is a system and method for centralized inspection and evaluation of baggage. Referring to FIG. 1, an overview of the centralized baggage screening system is illustrated. Airport 16 comprises a series of baggage screening equipment 10, 12, 14. This equipment may be x-ray equipment, electronic beam equipment, chemical sniffing equipment, or any type of inspection equipment currently used or projected to be used for inspecting packages in the future. Images and data recorded from these screening devices 10, 12, 14, are sent to local server 18. Local server 18 provides identification information noting such things as time an image was taken, location, screening equipment, and other information that identifies the location from which the actual data is being received. Server 18 packages this information into a data packet 17 and conveys that data packet to a central screening location 20, as more fully set forth below.

Similarly, another location, which might be an airport, 22 has its own baggage screening systems 24, 26, 28 which provide time tagged, and identified images and data to server 30. Server 30 then in turn creates its own packetized data 32 before shipment to central screening location 20.

Referring to FIG. 2, the central screening location is illustrated. Data packets 32, 17 are received by server 34 and placed in a queue. An inspector at workstation 36 picks the next data packet in the queue for inspection. Similarly, workstations 38 and 40 select images from the data packets in a queue via server 34.

Inspectors at the various work stations 36, 38, 40 then inspect the images presented to them making judgments whether or not to "okay" the baggage in question and therefore pass that particular bag on to the passenger or to send a signal to "hand examine" or to sequester the baggage in question.

Inspectors at the various workstations 36, 38, and 40 can also assign a risk level to their inspection results with a low risk or high risk, or points in between being associated with the image (on any risk scale known in the art). Based upon the workload and the risk assessment number associated with the image, the baggage in question can then be passed to the passenger or held for subsequent inspection.

When an inspector notes an item of a particular threat, such information can be provided through server 34 to local authorities as an alert 45 so that other security action can be taken to detain the baggage and the passenger involved.

It is also possible for inspectors at workstations 36, 38, and 40 to ask for a higher level of review of an image in question. Where this occurs the image in question is passed to a "senior" workstation 48 for subsequent review by a more senior experienced inspector. That inspector has the same options available to the inspector as those at work stations 36, 38, and 40, that is to assign a risk factor to the image, to detain the baggage, to provide an alert to local authorities and all other options available to other inspectors.

The central inspection location 20 also comprises an image store 42 where all images for given periods of time are stored in the event that subsequent review and quality control is necessary. These images in image store 42 can be called up for review by appropriate authorities.

The central location 20 also comprises a test image store 44 whereby images having known items of interest or threat can be provided into the queue of server 34 for subsequent inspection by the various inspection stations 36, 38, and 40. In this fashion an inspector at any one of the workstations will receive a test image that the inspector does not know is in fact a test image. Thereafter the inspector's report can be made and quality of the inspector's work can be assessed.

The central location 20 also comprises an administrative store 46 wherein test results, identification of various administrative items such as identification of inspectors, their locations, the stations being screened, and a variety of other administrative data is kept.

Server 34 also comprises various artificial intelligence types of tools. Such tools can recognize shapes, textures, and specifics of images that would automatically raise a flag. Server 34 can thus pre-process the data packets 32, 17 to view this type of information.

It is also important to note that various baggage inspection stations may comprise not only images of the contents of baggage but may also contain data such as from explosive sniffers. Further, inspection of baggage may be accomplished by infrared, x-ray, electron beam, and other types of sensors known in the art. It is within the scope of the present invention to combine these images into a composite image that can then be presented as a data packet to the various inspection workstations 36, 38, and 40. Therefore inspectors at various workstations can receive enhanced images that are actually the composite of multiple data sources that are associated with the baggage inspection process.

In operation, x-rays, explosive "sniffers" or other type of inspection is executed. A processor at the inspection station detects the edges of baggage and separates the scans of each individual bag. Each image is then converted into a gray scale or other representation. Thereafter, the image is compressed to save data transmission time, and other data is associated with the image. For example, the inspection station number, the time of day, the bag ID at a minimum are all associated with a particular image before transmission. Other data that could be associated include (but are not limited to) photograph and ID of the bag's owner, flight information, impressions of the remaining physical inspectors about the owner. The compressed data is then transmitted to a central facility for inspection.

At the central facility, the data is placed into a queue. A pool of trained screeners pick data packets from the queue and review the individual images/data and respond with a range of responses. For example, the response may be and "ok" or "pass" on the particular bag. Thereafter the traveler can be sent on his way with the examined bag. A message could be sent to "hand examine" the particular bag. Whenever a hand examine message is sent, a risk factor is associated with the bag. With for example, but without limitation, 1 being the lowest risk and 9 being the highest risk. Therefore in times of high traffic volume, a risk assessment can be made and low risk items can be "passed" without hand examination if that judgment call is made.

In addition, an alert in association with a definite threat or weapon can also be sent by the central facility to the screening station, to airport security, and also to regional security for a particular area. In this fashion a large-scale alert may be sent when a definite alert has been located by the operators.

At the inspection stations, local operators then can operate on the central office response to either pass a bag, inspect a bag, or detain the bag and the traveler.

At the central facility a hierarchy of review takes place. At the first tier level would be the lowest skilled operator. Such operators would categorize simple cases which are obviously safe or obviously hostile. In the event that the first tier operator cannot make a decision, more complex cases are sent onto a second tier review. At the second tier review, more skilled operators who are potentially higher paid, review the images. Such second tier operators are better able to understand the imaging process and deal with the potential electronic enhancements that may be available at their workstations. Finally a third tier of operators who are highly skilled handle the most complex evaluation situation. Note that there is no fundamental limit to the tiers of evaluation, one, two, three or more tiers could be in place depending on need. This tiered approach, in addition to allowing less skilled human evaluators to perform triage, separating obviously innocuous or dangerous bags and only passing those needing further review to higher tiers, enables the introduction of less than perfect automated or heuristic evaluation tiers. While in conventional scanning an automated system that could only unambiguously clear 10 percent of bags would be nearly useless, in this system as an early screening level, it could reduce manpower needs by roughly 10 percent.

As a result of the review at the central facility various recommendations noted above can be made.

A quick analysis of bandwidth and communication needs to implement this system shows that it is quite feasible. At the present time the scanning or evaluation of a bag is approximately 5–10 seconds and includes the bags transit time through an inspection machine, operator evaluation time, and transit time to a pick up area where the bag is picked up by the passenger, thus we have a time budget of at least 5 seconds to perform data compression, transmission, evaluation and response. X-ray images of approximately 1200 by 1200 pixels can be compressed substantially yielding image sizes of between 100,000 and 1,000,000 bits. This amount of data could be transmitted over a DSL link in 0.1–5 seconds or a DS-2 data link in less than 0.05 seconds. Thus it is feasible for a small airport with only a few stations to inexpensively transmit the required data, while large airports could easily transmit the flood of data generated.

Once the data arrives at the central facility, it is placed into a queue, a preferred embodiment would be for this queue to be implemented using a high-speed scalable database system or systems. From this database, evaluators (both human and automated) will select the "next" work item to evaluate. A high-speed workstation can quickly display the images/data and allow the operator to make his/her assessment, then continue on to the next bag. Historical records (kept for a TBD amount of time) would be made of the decision and of the underlying images/data for later analysis if necessary.

Note that while in today's world, passage is a pure yes/no event. In this system, an evaluator could assign risks to the person or bag. These risks could be further evaluated even after the person has left the inspection station. Thus it is possible that a more judicious review of a particular bag may result in an alarm even after the person has entered the secure area. While clearly it is the intent to catch attackers at the stations, the ability to re-evaluate bags already in the security area may provide ways to catch or thwart attacks in progress.

Training/evaluation of operators could be easily accomplished in this system by simply adding canned "threat" images/data to the data queue to be processed by that operator. Thus an operator could receive up to several test bags per day, (rather than less than monthly in today's environment). This frequency of test data will encourage operators to be alert and provide quick detection of operators who are unable to perform. Since the workflow is completely computerized, a totally novice operator could be placed at a station and given on-the-job training by running a typical daily workload of historically collected data interspersed with test threat data. The system could prompt the operator and point out the threats in the training data through on-screen display initially and then only if there is a mistake made later. Allowing training to take place on the actual equipment in the actual environment will further decrease cost and increase the effectiveness of training.

Evaluators could also be backed up by other evaluators. Thus for a number of reasons, an evaluator's results could be compared with results of a separate evaluator given the same data. This could be used for a number of reasons including but not limited to states of extreme threat, or simply to compare effectiveness and consistency of training.

Individual operators would be given ID's, thus when they "log on" to a workstation, they will be given work that is appropriate to them regardless of which station they use. Thus from the same station, a trainee would get training data, a level 1 evaluator would get appropriate data and a higher level expert evaluator would get only data that would require the most expert analysis.

While discussions have focused on a "Central site" it is possible that there are multiple evaluation centers that either operate independently or preferentially, operate in conjunction, sharing evaluation data through access to each others databases as well as potentially sharing data to be evaluated to balance load.

Lastly, while data profiling retains a bad connotation because it has been often applied to racial inequality, it is possible to profile the baggage owner using other than racial data and to assign a risk to that individual, if an individual is assigned a risk factor (for any reason) or a non-risk factor. This data could be used to augment the data already passed with the baggage to enhance the evaluation of the bags' data.

A centralized system and method of security screening has now been described. While baggage screening has been described, it is important to note that the present invention can be used to screen not only baggage but also packages of all types such as shopping bags, personal bags, backpacks and other types of packages that are desired to be screened at venues such as sporting events, theatrical events and events of all types where security enhancement is needed. While airports are a significant location other locations must be protected as well. It will be apparent to those skilled in the art that other variations of the present invention can be accomplished with out departing from the scope of the invention as disclosed. To further assist in the description of the present invention a power point presentation of associated slides are attached hereto and incorporated herein by reference in its entirety for all purposes.

We claim:

1. A system for centralized security screening comprising:
   a remote screening facility adapted to screen baggage and to create baggage information; and
   a centralized screening facility connected to the remote screening facility adapted to review all baggage information created at the remote screening facility and to instruct the remote screening facility regarding handling of an item under inspection.

2. The system far centralized security screening of claim 1 wherein:
   the remote screening facility comprises a plurality of baggage screenIng stations each of which provides baggage data for further processing.

3. The system for centralized security screening of claim 2 wherein the remote screening facility further comprises a server adapted to receive the baggage data, and further adapted to create data packets of baggage data and related data for transmission to the centralized screening facility.

4. The system for centralized security screening of claim 3 wherein:
   the centralized screening facility comprises a test image store adapted to provide test images to workstations at the centralized screening facility at random intervals.

5. The system for centralized security screening of claim 4 wherein: the centralized screening facility further comprises means for alerting security authorities when baggage information of concern is detected.

6. The system for centralized security screening of claim 4 wherein:
   the centralized screening facility comprises workstations adapted to view baggage information and to assign a risk factor to the images viewed.

7. The system for centralized security screening of claim 1 wherein:
   the centralized screening facility is adapted to provide a multi-tiered review of the information provided by the remote screening facility.

* * * * *